US012706113B2

(12) United States Patent
Liu et al.

(10) Patent No.: US 12,706,113 B2
(45) Date of Patent: *Aug. 11, 2026

(54) PERPENDICULAR MAGNETIC RECORDING WRITER WITH TUNABLE POLE SIDE BRIDGE DESIGN

(71) Applicant: Headway Technologies, Inc., Milpitas, CA (US)

(72) Inventors: Yue Liu, Fremont, CA (US); Moris Musa Dovek, San Jose, CA (US); Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/049,908

(22) Filed: Feb. 10, 2025

(65) Prior Publication Data

US 2025/0182781 A1 Jun. 5, 2025

Related U.S. Application Data

(63) Continuation of application No. 17/972,514, filed on Oct. 24, 2022, now Pat. No. 12,236,984.

(51) Int. Cl.
*G11B 5/127* (2006.01)
*G11B 5/23* (2006.01)
(Continued)

(52) U.S. Cl.
CPC .............. *G11B 5/1278* (2013.01); *G11B 5/23* (2013.01); *G11B 5/235* (2013.01); *G11B 5/3133* (2013.01);
(Continued)

(58) Field of Classification Search
None
See application file for complete search history.

(56) References Cited

U.S. PATENT DOCUMENTS

| | | | |
|---|---|---|---|
| 10,325,618 | B1 | 6/2019 | Wu et al. |
| 10,714,127 | B1 | 7/2020 | Chen et al. |

(Continued)

OTHER PUBLICATIONS

Office Action in U.S. Appl. No. 17/972,514, dated Dec. 26, 2023.

(Continued)

*Primary Examiner* — Craig A. Renner
(74) *Attorney, Agent, or Firm* — DLA Piper LLP (US)

(57) ABSTRACT

The present embodiments relate to a perpendicular magnetic recording (PMR) write head with a Tunable Pole Protrusion or Tunable Pole Performance (TPP) side bridge design. A PMR write head can include a main pole including a tip portion configured to be disposed at an air-bearing surface (ABS) and configured to interact with a magnetic recording medium. The PMR write head can also include a hot seed (HS) portion and a first write shield. The PMR write head can also include a first metallic side bridge disposed between the tip portion of the main pole and the HS portion. The PMR write head can also include a bias circuit including at least a first bias electrical pad and a second electrical bias pad directing an electrical current flow along an electrical path between the tip portion of the main pole and the write shield portion via the first metallic side bridge.

19 Claims, 14 Drawing Sheets

(51) Int. Cl.
*G11B 5/235* (2006.01)
*G11B 5/31* (2006.01)

(52) U.S. Cl.
CPC ............ *G11B 5/3143* (2013.01); *G11B 5/315* (2013.01); *G11B 5/3163* (2013.01)

(56) References Cited

U.S. PATENT DOCUMENTS

| | | | | |
|---|---|---|---|---|
| 10,714,129 | B1 | 7/2020 | Tang et al. | |
| 10,714,132 | B1 | 7/2020 | Chen et al. | |
| 11,152,021 | B1 * | 10/2021 | Liu et al. ............. | G11B 5/1278 |
| 11,557,314 | B1 * | 1/2023 | Asif Bashir et al. ........................ | G11B 5/1278 |
| 12,236,984 | B2 * | 2/2025 | Liu et al. ............. | G11B 5/1278 |
| 2020/0005815 | A1 | 1/2020 | Bai et al. | |

OTHER PUBLICATIONS

Office Action in U.S. Appl. No. 17/972,514, dated Apr. 9, 2024.
Notice of Allowance in U.S. Appl. No. 17/972,514, dated Oct. 23, 2024.

* cited by examiner

PERPENDICULAR MAGNETIC RECORDING WRITER WITH TUNABLE POLE SIDE BRIDGE DESIGN

CROSS REFERENCE TO RELATED APPLICATIONS

This application is a continuation of U.S. application Ser. No. 17/972,514, filed Oct. 24, 2022, the entire disclosure of which is hereby incorporated by reference.

TECHNICAL FIELD

Embodiments of the invention relate to the field of electro-mechanical data storage devices. More particularly, embodiments of the invention relate to the field of a perpendicular magnetic recording (PMR) write head for a hard disk drive (HDD).

BACKGROUND

Volumes of digital data can be stored on a disk drive, such as a Hard disk drive (HDD). The disk drive can comprise a head that can interact with a magnetic recording medium (e.g., a disk) to read and write magnetic data onto the disk. For instance, the disk drive can include a write head that is positioned near the disk and can modify a magnetization of the disk passing immediately under the write head.

Disk drives can utilize various technologies to write to a disk. For example, perpendicular magnetic recording (PMR) can relate to magnetic bits on a disk are directed perpendicular (e.g., either up or down) relative to the disk surface. PMR recording can increase storage density to the disk by aligning poles of magnetic elements on the disk perpendicularly to the surface of the disk.

SUMMARY

A head for a disk drive is described. Particularly, the present embodiments relate to a perpendicular magnetic recording (PMR) write head with a Tunable Pole Protrusion or Tunable Pole Performance (TPP) side bridge design. A first example embodiment provides a perpendicular magnetic recording (PMR) write head. The PMR write head can include a main pole including a tip portion configured to be disposed at an air-bearing surface (ABS) and configured to interact with a magnetic recording medium. The PMR write head can also include a hot seed (HS) portion.

The PMR write head can also include a first write shield connected to the HS portion and disposed at the ABS. The PMR write head can also include a first metallic side bridge disposed between the tip portion of the main pole and the HS portion. The PMR write head can also include a bias circuit including at least a first bias electrical pad and a second electrical bias pad. The bias circuit can direct an electrical current flow along an electrical path between the tip portion of the main pole and the write shield via the first metallic side bridge with an equivalent circuit of a lead resistor and a tip resistor connected in series between the first bias electrical pad and the second bias electrical pad.

In another example embodiment, a write head is provided. The write head can include a main pole including a tip portion configured to be disposed at an air-bearing surface (ABS) and configured to interact with a magnetic recording medium. The write head can also include a hot seed (HS) portion.

The write head can also include a first write shield connected to the HS portion and disposed at the ABS. The write head can also include a first metallic side bridge disposed between the tip portion of the main pole and the HS portion. The write head can also include a bias circuit directing an electrical current flow along an electrical path between the tip portion of the main pole and the write shield via the first metallic side bridge with an equivalent circuit of a lead resistor and a tip resistor connected in series between a first bias electrical pad and a second bias electrical pad. The bias circuit can include a protect resistor electrically connected between the first bias electrical pad and the second bias electrical pad. The lead resistor and the tip resistor can be disposed in parallel with the protect resistor.

In another example embodiment, a system is provided. The system can include a main pole including a tip portion configured to be disposed at an air-bearing surface (ABS) and configured to interact with a magnetic recording medium. The system can also include a hot seed (HS) portion.

The system can also include a first write shield connected to the HS portion and disposed at the ABS. The system can also include a first metallic side bridge disposed between the tip portion of the main pole and the HS portion. The system can also include a second write shield electrically connected to the first write shield. The system can also include a second metallic side bridge between the tip portion of the main pole and the second write shield.

The system can also include a bias circuit including at least a first bias electrical pad and the second electrical bias pad. The bias circuit can direct an electrical current flow along an electrical path between the tip portion of the main pole and the write shield via the first metallic side bridge, and along the between the tip portion of the main pole and the second write shield via the second metallic side bridge.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Disk drives can utilize various technologies to write to a disk. For example, perpendicular magnetic recording (PMR) can relate to magnetic bits on a disk are directed perpendicular (e.g., either up or down) relative to the disk surface. PMR recording can increase storage density to the disk by aligning poles of magnetic elements on the disk perpendicularly to the surface of the disk.

Further, a disk drive head can include a main pole (MP) with a tip portion configured to be disposed near the surface of the disk. The distance between the main pole tip portion and the disk can be controlled by a dynamic fly height (DFH) writer heater. Particularly, DFH writer heater can heat a portion of the head, causing the MP to expand or contract, thereby modifying the distance between the main pole tip portion and the disk. Electrical energy can be provided to any of the DFH writer heater and the MP tip portion via electrical pads, forming a circuit in the head.

In some instances, a Tunable Pole Protrusion or Tunable Pole Performance (TPP) design can form an electric path along a main pole (MP) tip in parallel to a DFH writer heater without modifying a pad layout of a PMR head. For example, when the DFH writer heater is electrified, a portion of the current can flow through the MP tip portion. The current flowing through the MP tip portion may increase in heat and also introduce a bias field (e.g., a Oersted bias field) to the MP tip portion. The MP tip portion can include any of a hot seed (HS) portion and a side shield (SS) portion.

With heating locally concentrated at a MP tip portion, MP tip protrusion can be increased with an improved writeability of the head. Further, with the bias field generated at the MP tip portion, MP and HS rotation may become more coherent and can improve writer high-frequency response.

Figure 1:
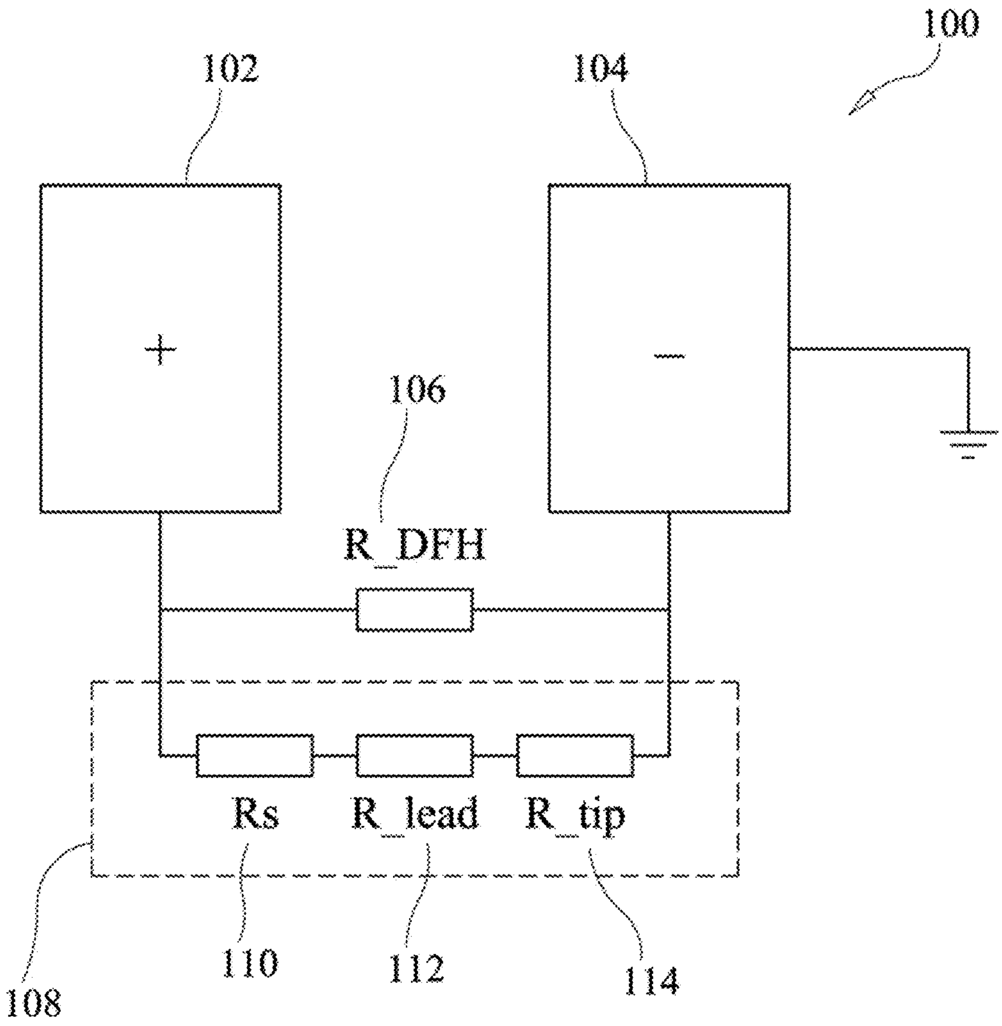
FIG. 1 illustrates a circuit design of an example TPP design for a write head according to an embodiment.

FIG. 1 illustrates a circuit design 100 of an example TPP design for a write head. As shown in FIG. 1, the circuit 100 can include writer heater pads 102, 104. The pads 102, 104 can initiate a current flow (e.g., a direct current (DC) current flow) through the circuit 100. For example, first pad 102 can provide a positive current flow, with the second pad 104 connected to a ground. The circuit 100 can further include a DFH resistor 106 disposed in parallel with a set of resistors 108. The DFH resistor 106 represents a DFH writer heater. The set of resistors 108 can include a first resistor 110, a lead resistor 112, and a tip resistor 114 in series with one another. The circuit 100 can provide an electrical path along a main pole (MP) tip in parallel to a DFH writer heater.

The tip resistor 114 can account for the resistance at MP tip region. MP can be electrically connected to a build-in series resistor 110, which can be electrically connected to the DFH (+) pad 102. The lead resistor 112 can account for the lead resistance contribution other than the series resistor 110 and the tip resistor 114. The nominal resistance of the series resistor 110 can satisfy both DFH heater power and MP tip bias current requirements.

FIGS. 2A-2D illustrate schematics of various types of writers. For instance, the schematics 200*a-d* provide various types of 1+1T writers with added insulation layers to allow for electric contact between the MP and writer shields at the MP tip portion.

Figure 2A:
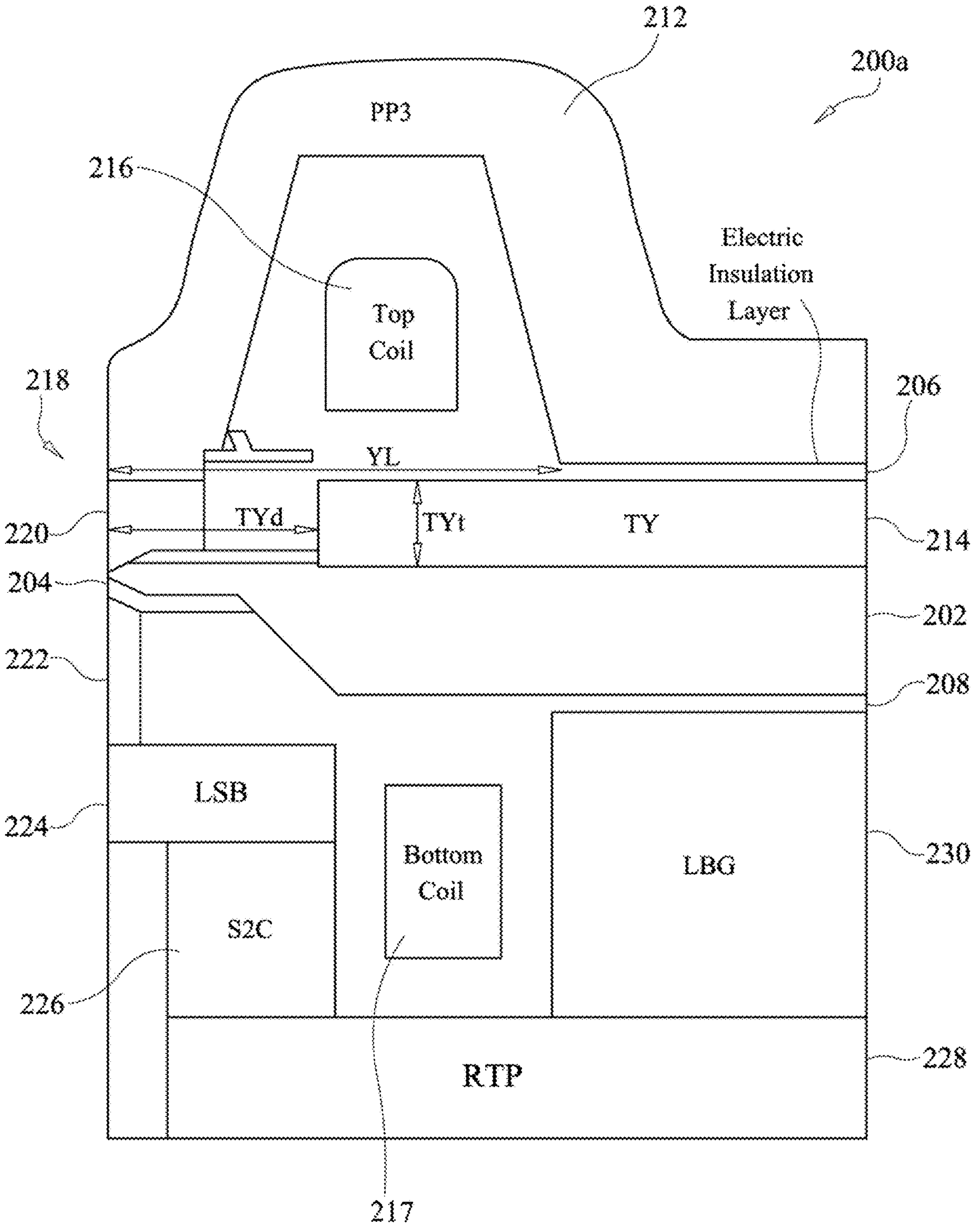
FIG. 2A illustrates a cross section view of a first example write head according to an embodiment.

FIG. 2A illustrates a cross section view of a first example write head 200*a*. The write head 200*a* can include an ultimate double yoke (uDY) top with a recessed dual write shield DWS (rDWS) design with a back gap connection (BGC).

As shown in FIG. 2A, the head 200*a* can include a MP 202 that includes a tip portion 204. The tip portion 204 can be disposed near a disk at an air-bearing surface (ABS) 218. The head 200*a* can further include electric insulation layers 206, 208. A first electric insulation layer 206 can be disposed between an uppermost shield (PP3) 212 and a top yoke (TY) 214. The first electric insulation layer 206 can also be disposed around a first coil 216. A thickness of the TY 214 can be defined by TYt and a distance that the TY 214 is recessed from the ABS can be represented by TYd and comprising a Yoke Length (YL). The second electric insulation layer 208 can separate the main pole 202 from a lower back gap (LBG) layer 230 and a second coil 217.

The MP tip portion can be connected to a write shield 220 and a lower shield 222. The lower shield 222 can be connected to a LSB 224, S2C shield 226, and a return to path (RTP) shield 228 that can be connected to LGB layer 230.

Figure 2B:
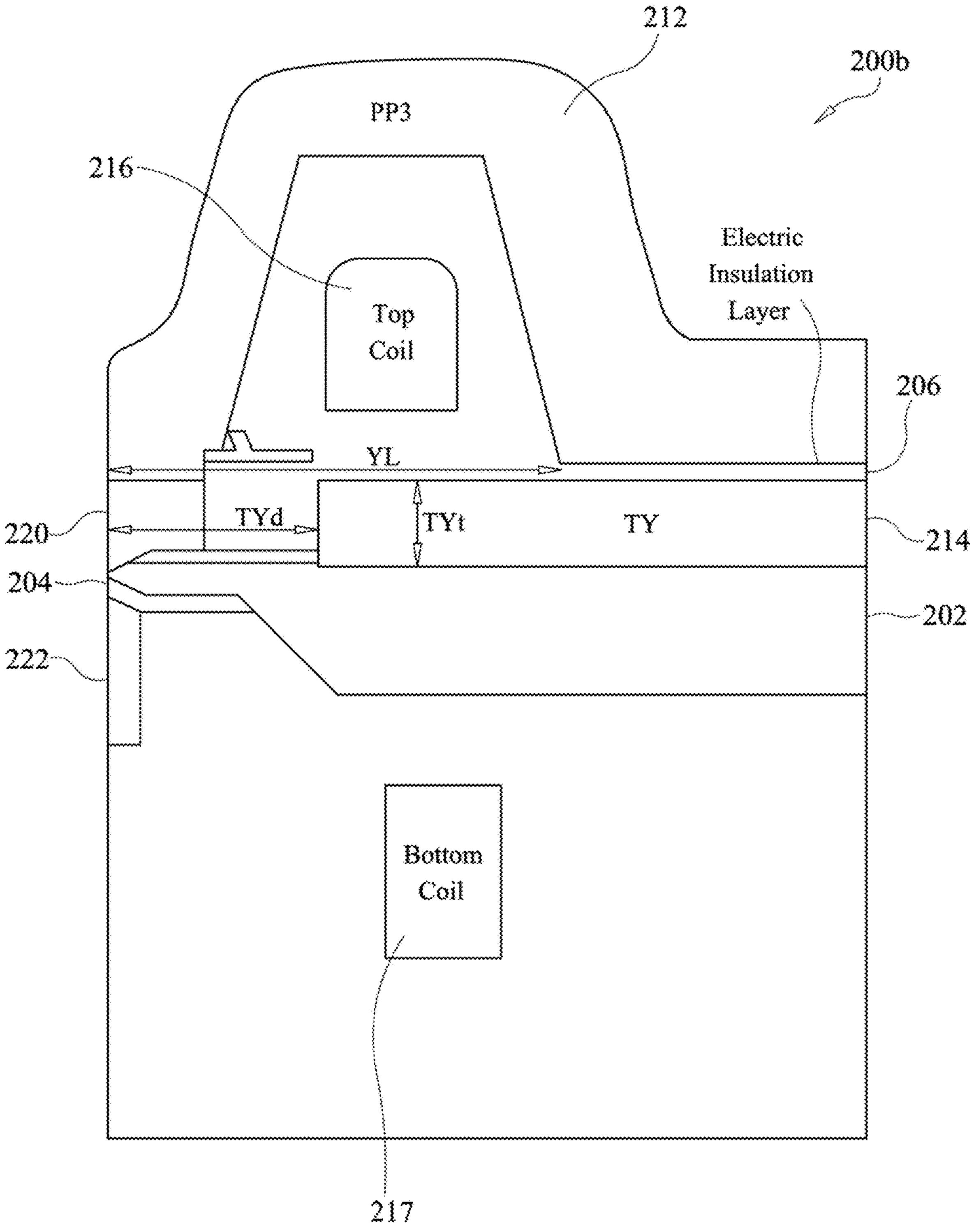
FIG. 2B illustrates a cross section view of a second example write head according to an embodiment.

FIG. 2B illustrates a cross section view of a second example write head 200*b*. As shown in FIG. 2B write head 200*b* can include a uDY top with a nDWS bottom portion. An electric insulation layer 206 can insulate a coil 216 and PP3 212 from the main pole 202.

Figure 2C:
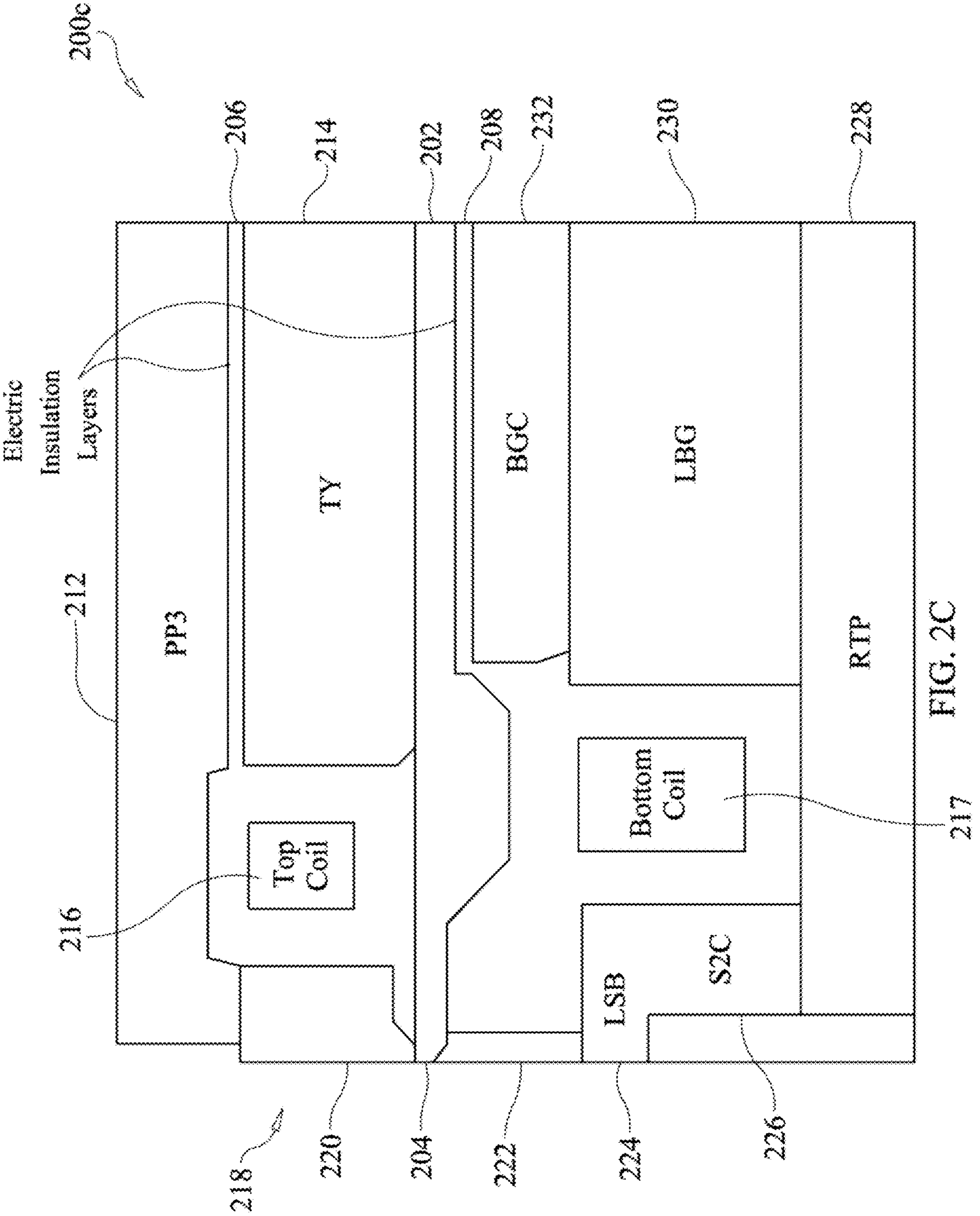
FIG. 2C illustrates a cross section view of a third example write head according to an embodiment.

FIG. 2C illustrates a cross section view of a third example write head 200*c*. As shown in FIG. 2C write head 200*c* can include an easy planar (ePL) top with a rDWS bottom portion. A first portion of the electric insulation layer 206 can be disposed between PP3 212 and TY 214. A second portion can separate the MP body from a BGC layer.

Figure 2D:
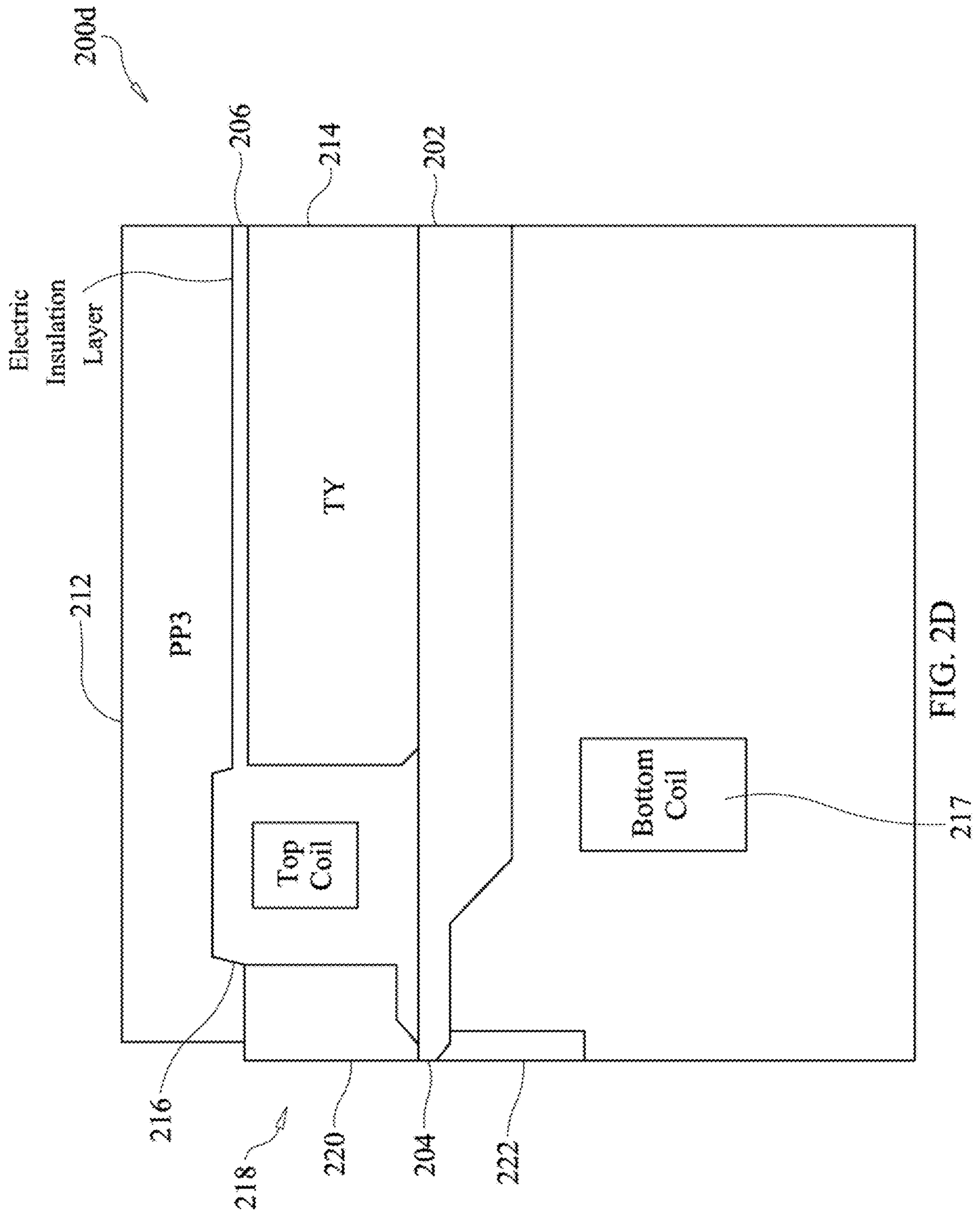
FIG. 2D illustrates a cross section view of a fourth example write head according to an embodiment.

FIG. 2D illustrates a cross section view of a fourth example write head 200*d*. As shown in FIG. 2D write head 200*d* can include an easy planar (ePL) top with a nDWS bottom portion.

For each of the heads as described in FIGS. 2A-2D, each can include a top coil 216 and bottom coil 217 to have writing current passing through a trailing shield (e.g., writing shield 1 220), PP3 212, MP 202, TY 214, and a taper bottom yoke (tBY) that can form a top driving magnetic loop that brings magnetic flux to the MP tip 204 to write positive or negative field into a media.

The PP3 212 can be exposed (e.g., as shown in FIGS. 2A-2B) or recessed to the ABS (e.g., as shown in FIGS. 2C-2D). In some instances, the recessed PP3 can be exposed for less process steps if a wide area track erasure (WATE) to write shield (e.g., 220) interface is manageable. Further, the exposed PP3 can satisfy various thermomagnetic (T/M) metrics with a larger metal area at the ABS. The write heads as described herein can relate to either 1+1T writers or other writer types, such as 1+1T or 1+0T or 2+2T writer structures, for example.

Further, in the heads as shown in FIGS. 2A-2D, an electric insulation layer (e.g., 206, 208) can be added between PP3 212 and TY 214 to isolate the MP 202 electrically from the top loop. In some instances, due to a BGC in FIGS. 2A, 2C, an additional electric insulation layer 208 can be added to isolate MP electrically from the bottom loop. For instance, in FIG. 2A, the electric insulation layer 208 can be added between LBG 230 and MP 202. In FIG. 2C, electric insulation layer 208 can be added between BGC 232 and MP 202. The electric insulation layer 208 can be applicable to either a uDY or an ePL top structure. The electric insulation layer can include of one or more layers of a metallic oxide (e.g., AlOx, SiOx, TiOx or TaOx) with a thickness ranging between 10-300 nm.

For heads with a circuit design similar to that of FIG. 1, the MP tip can be electrically connected to either a trailing side hot seed (HS), the side shield (SS), or both the HS and the SS as described herein. If any of the write shields (e.g., writer shield 200, a side shield, LS 222) are electrically connected to a DFH ground pad while MP back 202 is connected to a series resistor Rs, which can be connected to a DFH+pad, a bias current can be formed and flowing from MP to Shield. If any of the write shields (e.g., writer shield 200, a side shield, LS 222) are electrically connected to a series resistor Rs which is connected to a DFH+pad while MP back 202 is connected to a DFH ground pad, a bias current flowing from Shield to MP can be formed.

FIGS. 3A-3E provides ABS views of various electrical connections between a MP tip and write shields. The embodiments as shown in FIGS. 3A-3E can show several metallic conducting path designs that can bridge writer shields and MP. The materials can include a single layer or multi-layers of non-magnetic metallic materials such as Ru, NiCr, Ta, Cu, W, Ti etc. Different designs may give different R_tip resistances. The material and the dimensions (e.g., width, thickness and height) of the confined path may also alter the R_tip resistance.

Figure 3A:
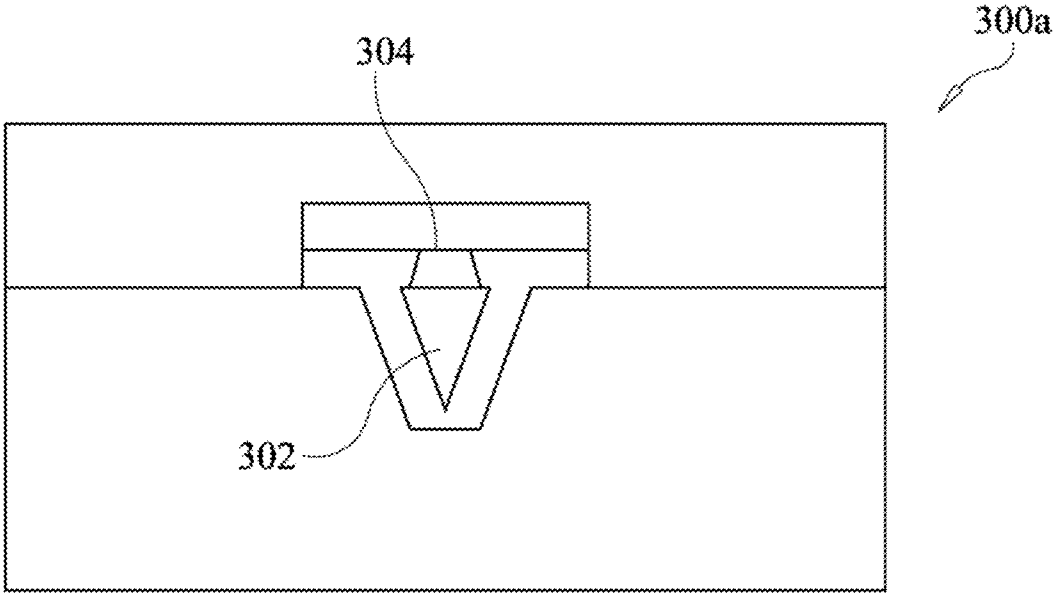
FIG. 3A illustrates a first example write head according to an embodiment.

FIG. 3A illustrates a first example write head 300*a*. As shown in FIG. 3A, a narrow electrical path can be formed between the MP 302 and an HS 304. The narrow electrical path can include a single layer or multiple layers of non-magnetic metallic materials but can also be applicable to special designed magnetic films to form spin oscillation when current is flowing through.

Figure 3B:
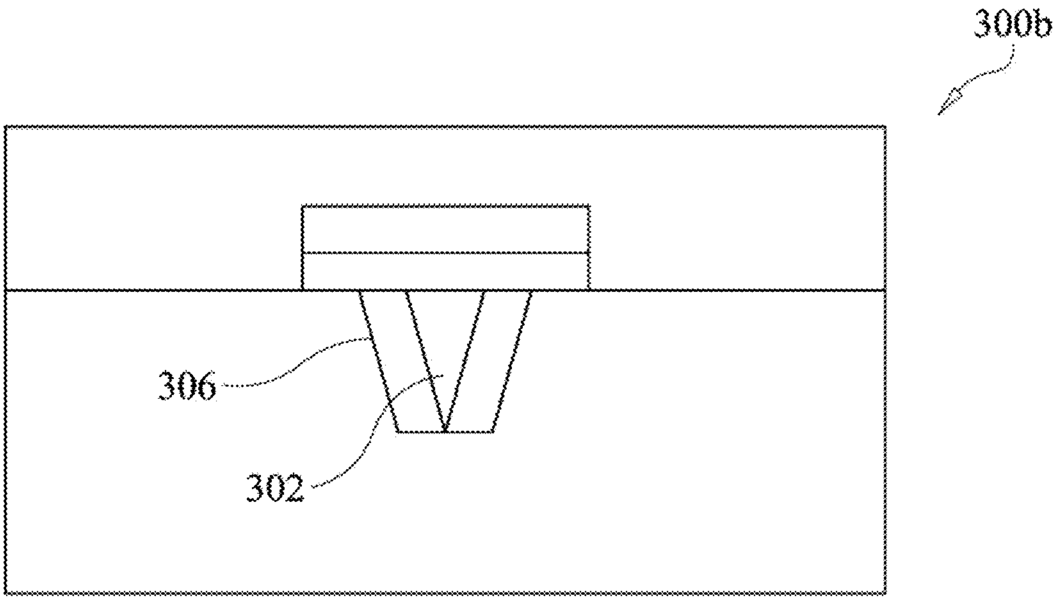
FIG. 3B illustrates a second example write head according to an embodiment.

FIG. 3B illustrates a second example write head 300*b*. As shown in FIG. 3B, an electrical path can be formed between the MP 302 and a SS 306 through metallic side gap (SG).

Figure 3C:
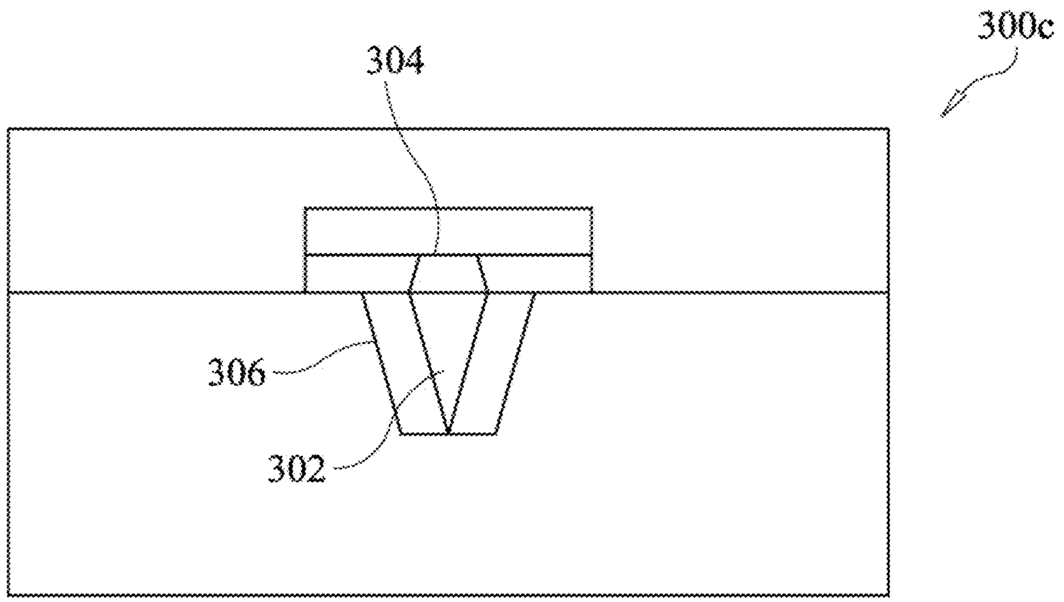
FIG. 3C illustrates a third example write head according to an embodiment.

FIG. 3C illustrates a third example write head 300*c*. As shown in FIG. 3C, a narrow electrical path can be formed between both the MP 302 and the HS 304 and the MP 302 and the SS 306. The narrow electrical path can include a single layer or multiple layers of non-magnetic metallic materials but can also be applicable to special designed magnetic films to form spin oscillation when current is flowing through.

Figure 3D:
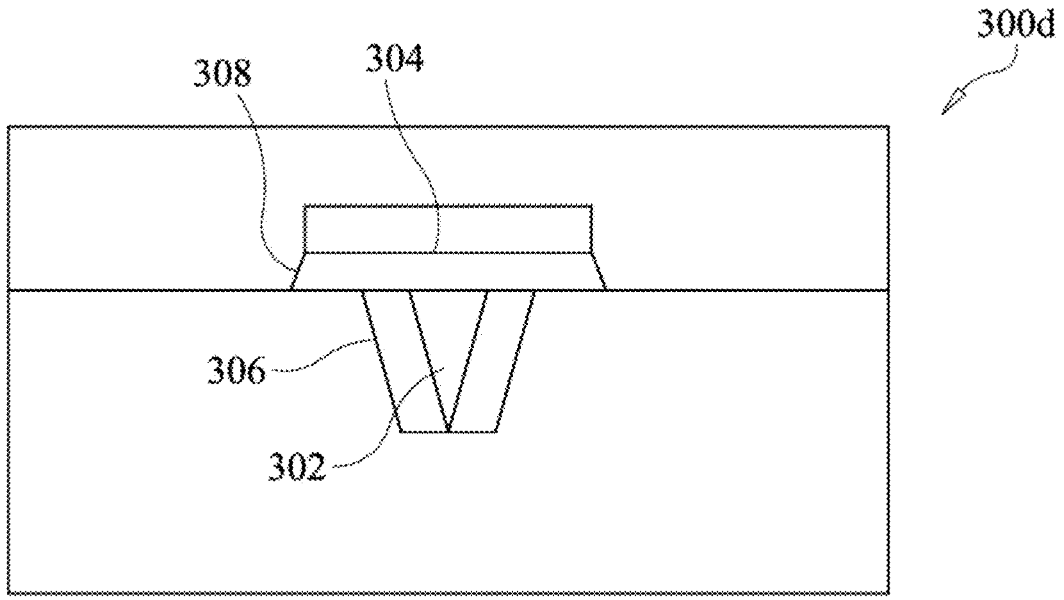
FIG. 3D illustrates a fourth example write head according to an embodiment.

FIG. 3D illustrates a fourth example write head 300*d*. As shown in FIG. 3D, an electrical path can be formed between both the MP 302 and a full width metallic WG 308, and between the MP 302 and SS 306.

Figure 3E:
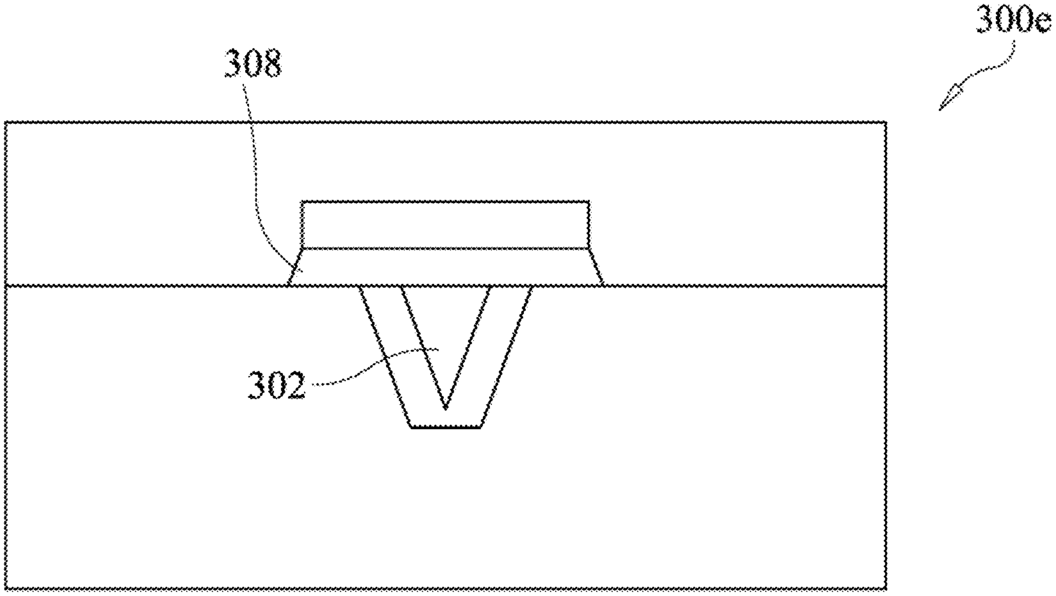
FIG. 3E illustrates a fifth example write head according to an embodiment.

FIG. 3E illustrates a fifth example write head 300*e*. As shown in FIG. 3E, an electrical path can be formed between the MP 302 and a full width metallic WG 308.

In some instances, if a same metallic material is used across write gap (WG), the write head 300*a* as described in FIG. 3A can include a confined path width close to or narrower than a PWA with a higher R_tip resistance than write head 300*e* as described in FIG. 3E with a full metallic WG. Similarly, the write head 300*c* in FIG. 3C can have a greater R-tip resistance than write head 300*d* in FIG. 3D. The write head 300*b* in FIG. 3B may include contact between a MP and the SS, while write heads 300*c*, 300*d* in FIGS. 3C-3D can have current flowing to the MP from both an HS and an SS. The R_tip in FIG. 3C can be lower than that of FIGS. 3A-3B, while the write head 300*d* in FIG. 3D R_tip can be the lowest if MP dimension, WG material, WG thickness and into ABS metallic path height are similar.

Figure 4A:
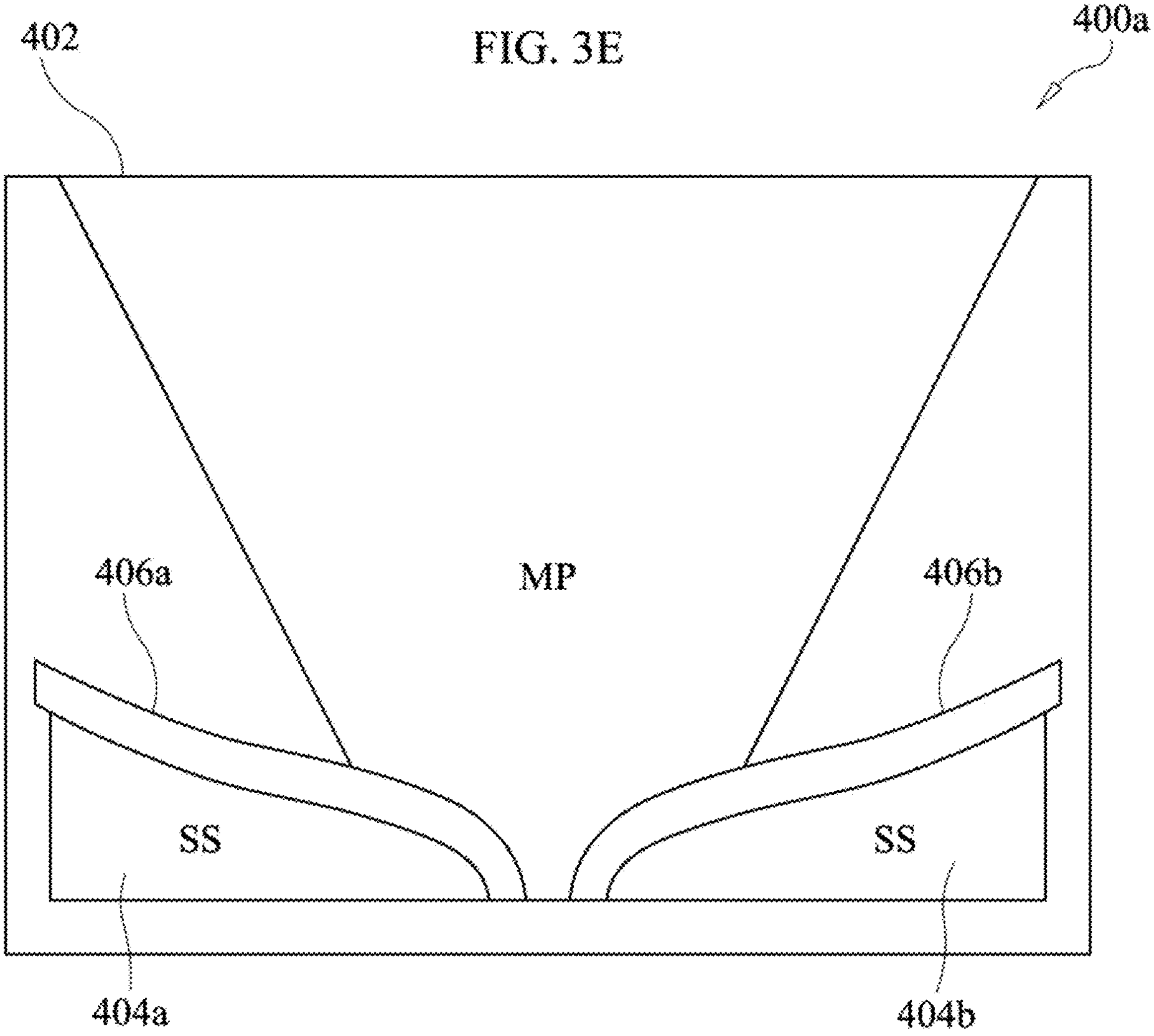
FIG. 4A illustrates a top view of a write with a conducting path formed between the MP and an SS according to an embodiment.
Figure 4B:
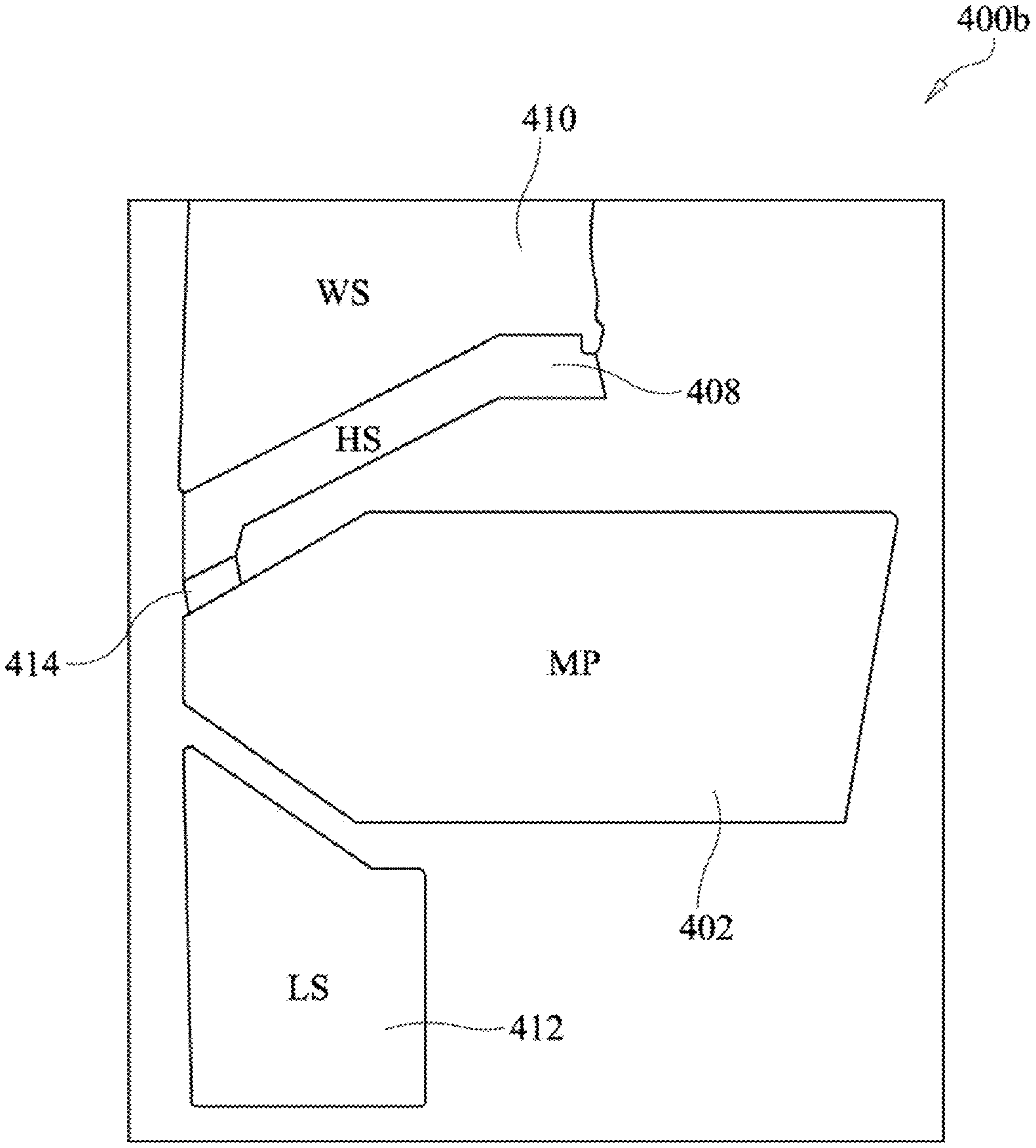
FIG. 4B illustrates a cross section view of a write head with a conducting path exposed to the ABS between a HS tip and MP tip through a metallic WG according to an embodiment.
Figure 4C:
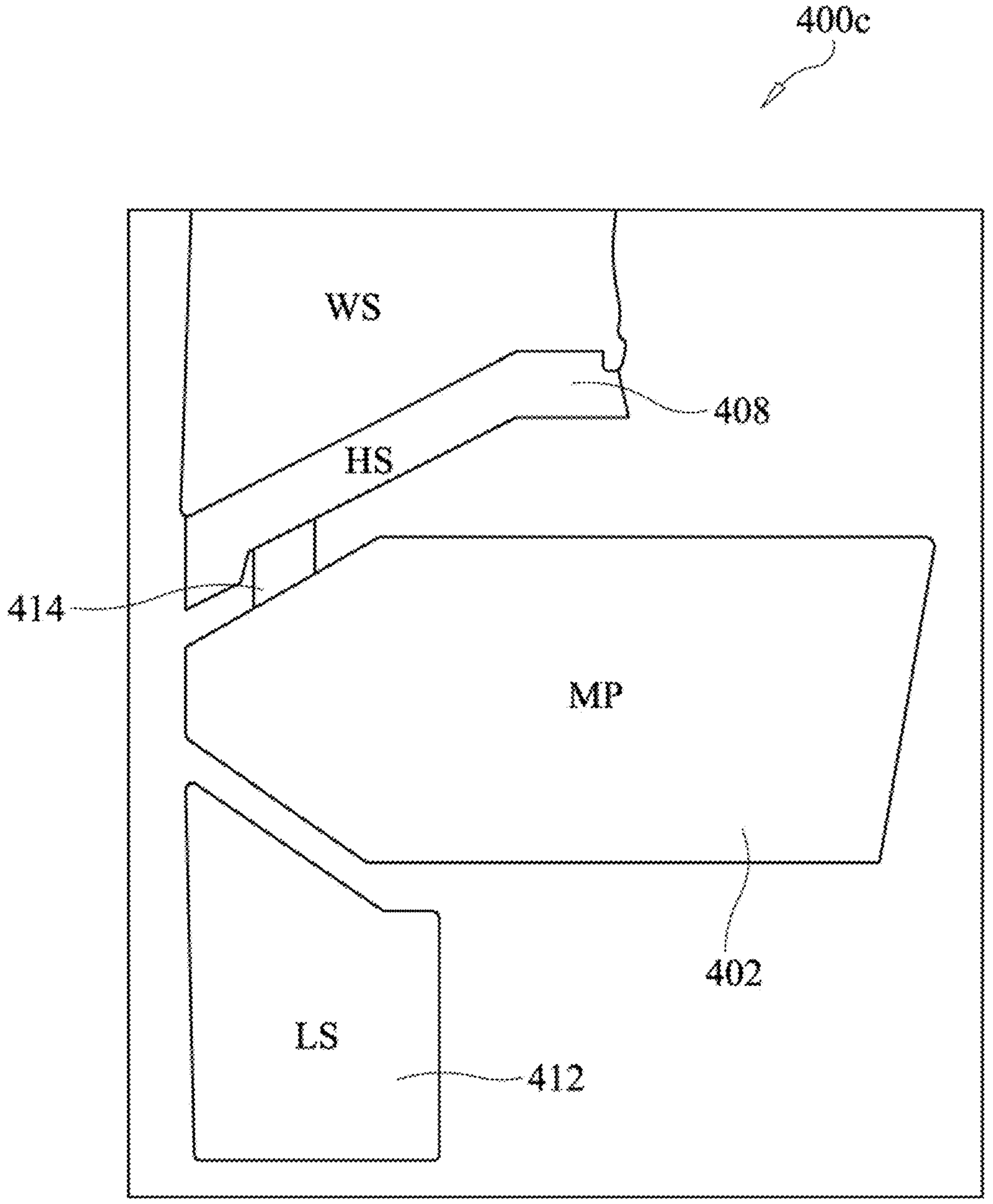
FIG. 4C illustrates a cross section view of a write head with a recessed conducting path between HS and MP according to an embodiment.

FIGS. 4A-4C illustrate top views of a write head with conducting paths formed between the MP and various write shields. FIG. 4A illustrates a top view of a write head (e.g., write head 300*a-c* in FIGS. 3A-3C) with a conducting path formed between the MP and an SS. As shown in FIG. 4A, the write head 400*a* can include a main pole 402 connected to side shield 404*a*, 404*b*. The conducting path can be formed between the SS 404*a*, 404*b* and MP 402 through a metallic side gap (SG) 406*a*, 406*b*. The SS can be disposed near an ABS with a height ranging between 50-120 nm. The SG can be between 20-60 nm.

FIG. 4B illustrates a cross section view of a write head 400*b* with a conducting path exposed to the ABS between a HS tip and MP tip through a metallic WG. As shown in FIG. 4B, the write head 400*b* can include a main pole 402 connected to a HS 408 via a WG 414. The HS 408 can be connected to a write shield (WS) 410. A LS 412 can be disposed at an opposition side of the MP 402.

The HS tip into an ABS height (eTHd) can be between 20-60 nm, and the non-magnetic WG thickness can be between 15-25 nm. The eTHd can be short and sensitive to lapping control, R_tip resistance can have a large device to device variation. FIG. 4C illustrates a cross section view of a write head 400*c* with a recessed conducting path between HS and MP. The into-ABS recess distance can be between around 50-100 nm. The width and height of the recessed conducting path can have more freedom than the exposed write head 400*b* as shown in FIG. 4B. For instance, a R_tip resistance can be fine-tuned to a preferred value with less device-to-device variation. Leading gap (LG) of FIGS. 4B & 4C can be shown as an oxide layer which is corresponding to X-section images of FIGS. 3A & 3E. LG can be filled with metallic layer for X-section images of FIGS. 3B, 3C & 3D (not shown but similar to 622 in FIG. 6D).

A TPP write head can provide an electric current path to MP tip for PMR heads without changing existing PMR pad layout, such that a PMR preamp and suspension can be applied transparently without any additional cost to backend processes and HDD application as equivalent circuit diagram shown in FIG. 1. However, for some write heads with additional pads to form an external bias from preamp to MP tip region, a TPP can directly utilize a bias circuit without the parallel bias from writer heater as equivalent circuit diagram shown in FIG. 5. Additionally, a TPP side bridge (TPP-SB) design as shown in FIG. 6A-6D can be disposed on top of the various types of electric connections between MP tip and writer shields (e.g., as shown in FIGS. 3A-3E, 4A-4C). The TPP-SB design can be applicable to both TPP by parallel path to writer heater bias scheme (e.g., with no additional pads) and TPP by external bias from preamp scheme (e.g., with two additional pads).

Figure 5:
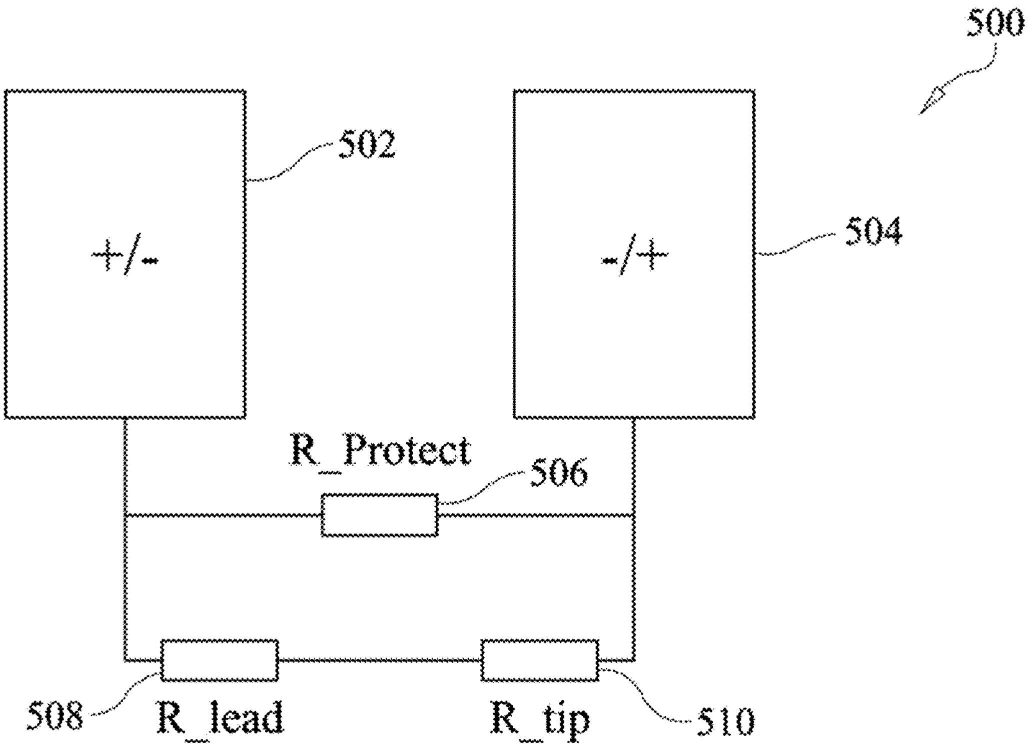
FIG. 5 illustrates an example TPP circuit with two bias pads according to an embodiment.

A TPP design can be applicable when two bias pads to preamp are available. In comparison to some TPP designs biased by a parallel path from writer heater, the Rs can be taken out while R_protect (e.g., ~500 Ohm) can be added across the two bias pads in case the device is open when the current source is applied as shown in FIG. 5. The advantage for such a TPP design with two additional bias pads can include the freedom to adjust bias current/voltage polarity and value for the best allowable ADC gain.

Figure 6A:
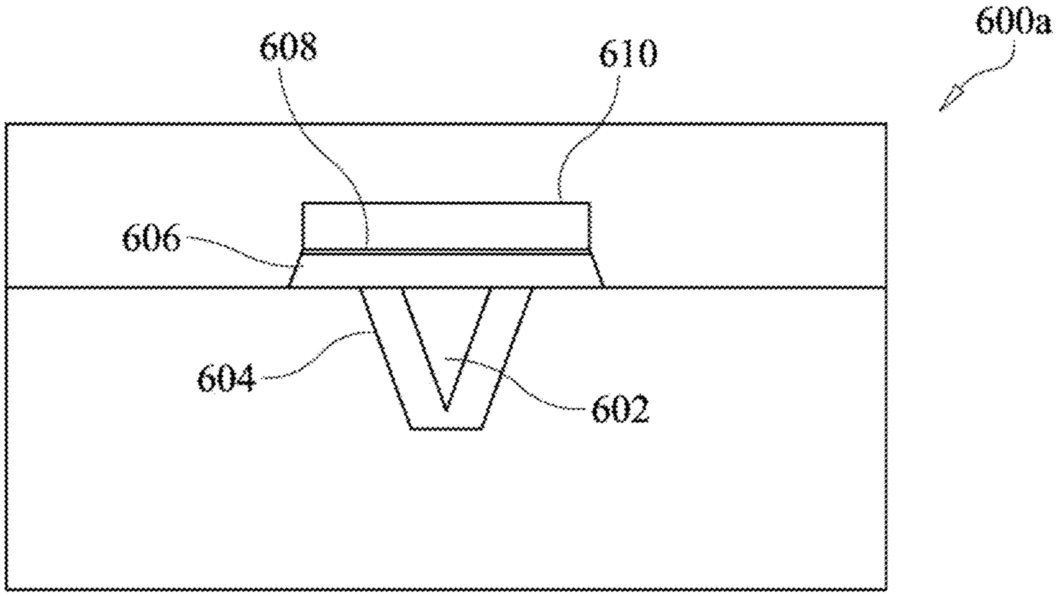
FIG. 6A illustrates an example write head with a metallic TPP-SBO design according to an embodiment.
Figure 6B:
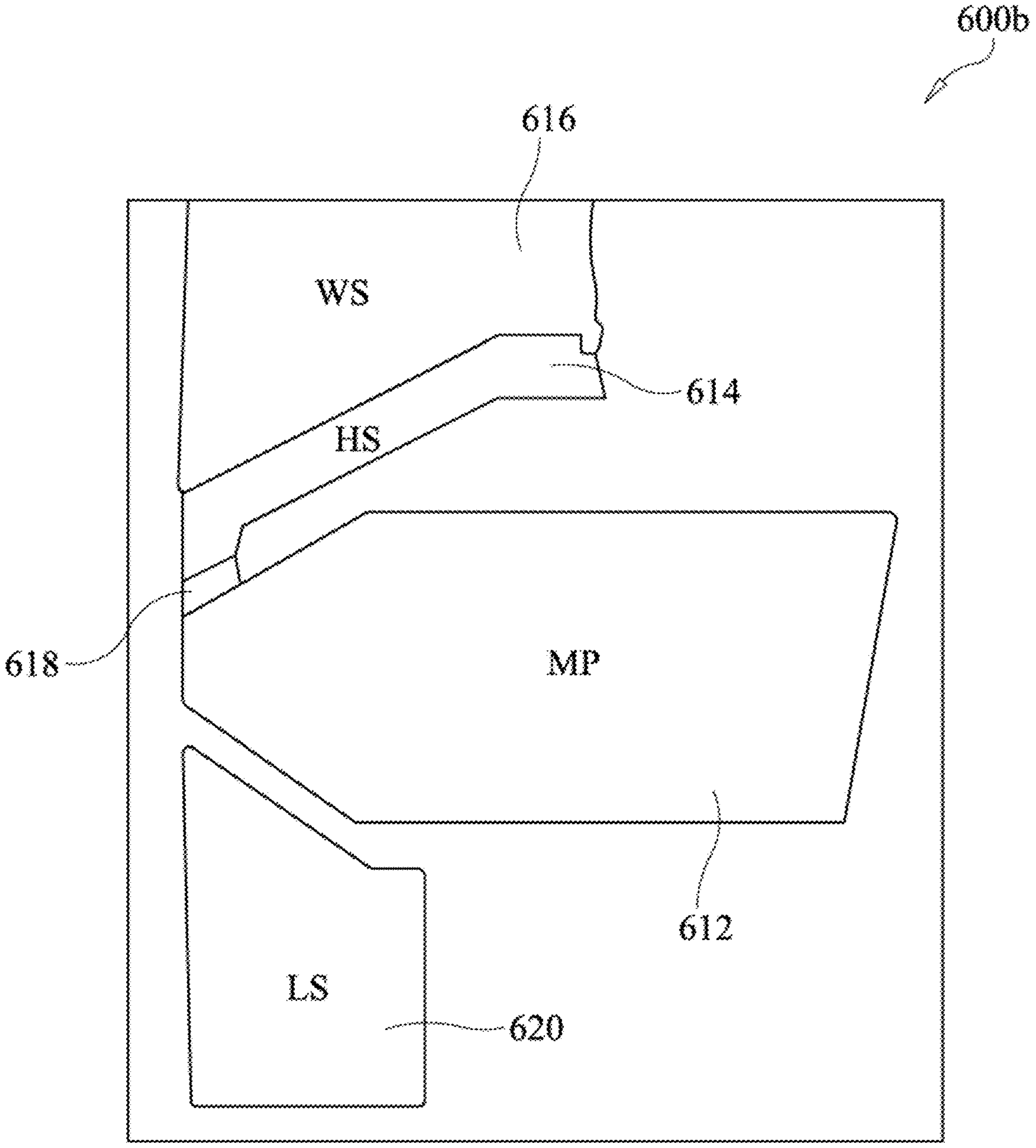
FIG. 6B illustrates a cross section view of a write head with a metallic TPP-SBO design according to an embodiment.
Figure 6C:
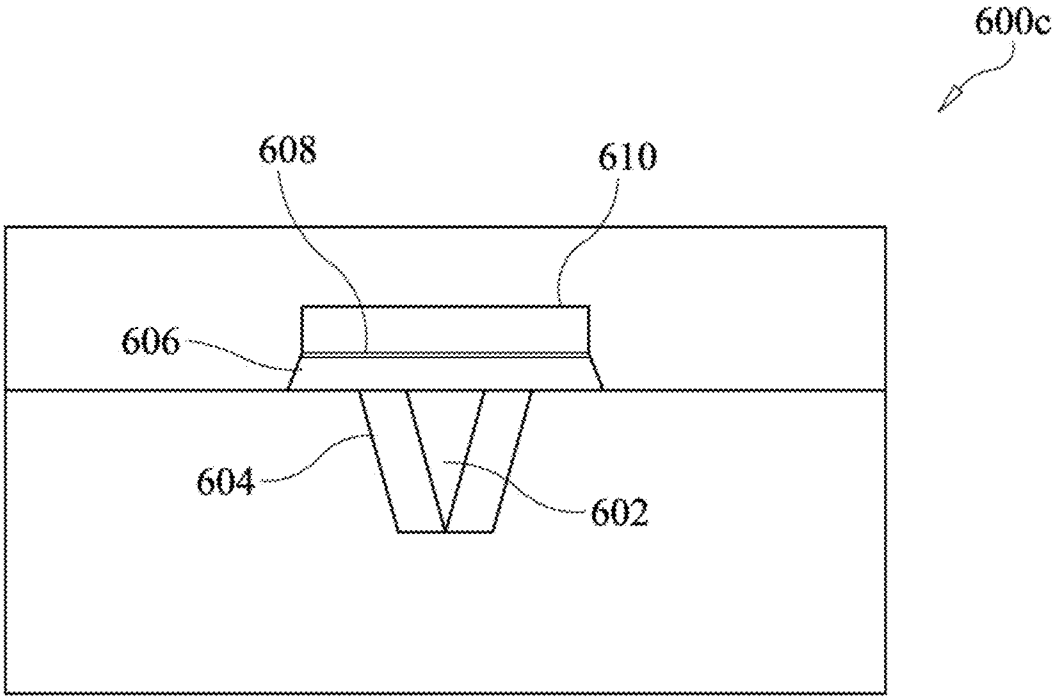
FIG. 6C illustrates a write head with a TPP-SBG design according to an embodiment.

Further, TPP-SB designs (e.g., TPP side bridge only (TPP-SBO) as shown in FIG. 6A ABS view and FIG. 6B cross-section view or TPP side bridge and side gap combination (TPP-SBG) as shown in FIG. 6C ABS view and FIG. 6C cross-section view) can have a full-width thin oxide layer of around ~1-4 nm (or 2 nm) including a material such as Al2Ox, SiOx, TaOx, TiOx etc. The oxide layer can be disposed above a metallic WG and not make any current flow directly into the HS. The metallic part of the WG can be single layer or multi-layers of non-magnetic metallic materials such as Ru, NiCr, Ta, Cu, W, Ti, etc. The total thickness of the nonmagnetic WG with oxide layer and metallic layers can be around 15-25 nm.

A TPP-SBO design can have a MP top to side shield metallic connection only through two side bridges. An example of such a write head is illustrated in FIGS. 6A-6B below.

Figure 6D:
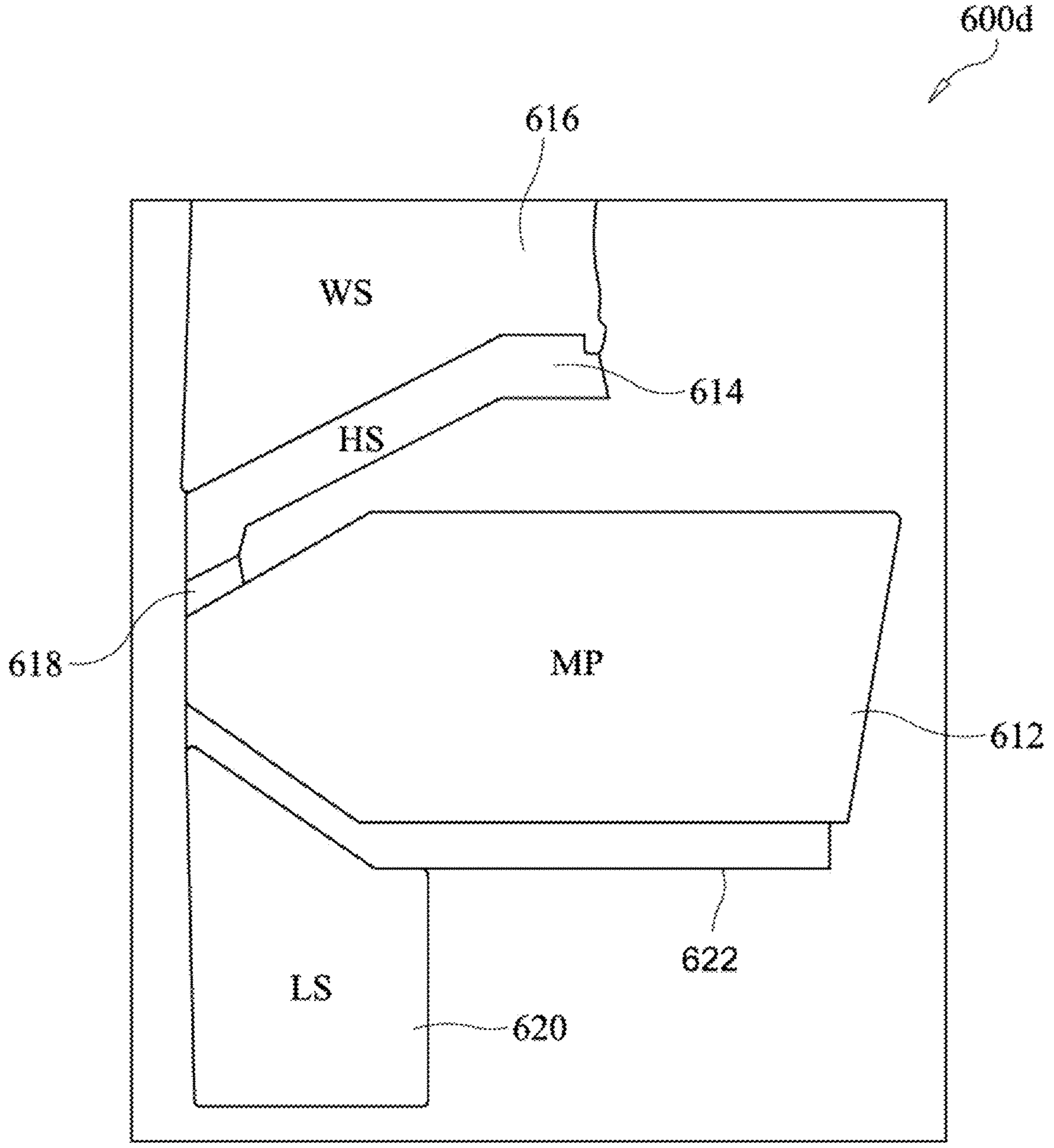
FIG. 6D illustrates a cross section view of a write head with a metallic TPP-SBG design according to an embodiment.

A TPP-SBG design can have MP connected to side shield through both metallic side gap and side bridges. An example of such a write head is illustrated in FIGS. 6C-6D below.

TPP-SB designs (TPP-SBO or TPP-SBG) can include additional designs to the various MP tip to writer shield connection schemes (e.g., as shown in FIGS. 3A-3E, 4A-4C). These schemes can be applicable to many PMR head pad layouts by constructing a bias circuit in parallel to writer heater. These schemes can also be applicable to head pad layout with two additional bias pads that can be directly driven by preamp with a selectable DC bias voltage/current source.

FIG. 5 illustrates an example TPP circuit 500 with two bias pads. As shown in FIG. 5, the circuit 500 can include two bias pads 502, 504 and a lead resistor (R_lead 508) and a tip resistor (R_tip 510) as the equivalent circuit if current flowing through write shield, MP tip and MP connected between the bias pads. Further, the circuit 500 can include a lead resistor (R_lead 508) and a tip resistor (R_tip 510) in series with one another and in parallel with R_Protect 506. In the embodiment as shown in FIG. 5, an Rs is not needed. R_protect 506 (with a resistance of ~500 Ohm) can be added in case device is open when current source is applied. The advantage for a TPP with two additional bias pads is the freedom to adjust bias current/voltage polarity and value for the best allowable ADC gain.

FIGS. 6A-6D illustrate various write heads with various TPP-SB design types. For instance, a full width thin oxide layer ~1-4 nm (e.g., 2 nm) including such as Al2Ox, SiOx, TaOx, TiOx etc. The oxide layer can be disposed above the metallic WG and allow for no current flow directly inside the HS.

FIG. 6A illustrates an example write head 600*a* with a metallic TPP-SBO design. As shown in FIG. 6A, the write head 600*a* can include a main pole 602 connected to a metallic WG 606. The metallic WG 606 is electrically isolated to HS layer 610 via an oxide layer 608.

FIG. 6B illustrates a cross section view of a write head 600*b* with a metallic TPP-SBO design. As shown in FIG. 6B, the write head 600*b* can include a main pole 612 connected to a HS 614 via a WG 618. The HS 614 can be connected to a WS 616. A LS 620 can be disposed at an opposition side of the MP 612. A TPP-SBO design can include an insulating layer between the HS and a metallic WG. In such instances, no current flow directly in the HS can change a thermal hot spot from MP and HS center region to MP center and side bridge regions. Since the HS has large volume of FeCo material, the HS can protrude above MP and a surrounding WS1. Current flowing in the HS can further enhance HS protrusion and reduce a reliability margin. A TPP-SBO design can modify a tip region local thermal protrusion profile to be reduced and more uniform. TPP-SBO design R_tip resistance can be higher than in the embodiment as shown in FIG. 3E. By relatively lowering down the bias current, it can be manageable to achieve a good ADC and reasonable lifetime.

FIG. 6C illustrates a write head 600*c* with a TPP-SBG design. As shown in FIG. 6C, the main pole 602 can be connected to a side shield 604 through both a metallic SG and metallic side bridge. The materials of metallic connection can be single layer or multi-layers of non-magnetic metallic materials such as Ru, NiCr, Ta, Cu, W, Ti etc. A total thickness of the metallic WG 606 and the oxide layer 608 can be around 15-25 nm.

FIG. 6D illustrates a cross section view of a write head 600*d* with a metallic TPP-SBG design. As shown in FIG. 6D, the write head 600*d* can include a main pole 612 connected to a HS 614 via a WG 618 which can include a thick metallic layer and a thin oxide layer. The HS 614 can be connected to a WS 616. A LS 620 can be disposed at an opposition side of the MP 612 with a side gap material 622 disposed between LS 620 and MP 612.

For a TPP-SBG design, R_tip resistance can be small and between a resistance of write heads as shown in FIGS. 3B and 3D. A much larger bias current can be applied without reliability concern from tip temperature rise. In comparison to the write head in FIG. 3B with all current from MP side to side shield, a TPP-SBG can adjust current distribution to partially from MP top to side bridges to side shield. Further, in comparison to the write head in FIG. 3D, the TPP-SBG can adjust current distribution to partially from MP top to side bridges and no current directly through HS to writer shield for a better performance.

In some embodiments, a perpendicular magnetic recording (PMR) write head is provided. The PMR write head can include a main pole (e.g., 612 in FIG. 6B and FIG. 6D) including a tip portion configured to be disposed at an air-bearing surface (ABS) (e.g., 218 in FIG. 2A) and configured to interact with a magnetic recording medium. The PMR write head can also include a hot seed (HS) portion (e.g., 614 in FIG. 6B and FIG. 6D).

The PMR write head can also include a first write shield (e.g., 616 in FIG. 6B and FIG. 6D) connected to the HS portion and disposed at the ABS. The PMR write head can also include a first metallic side bridge and an oxide layer (e.g., 618 in FIG. 6B and FIG. 6D) disposed between the tip portion of the main pole and the HS portion. In some instances, the first metallic side bridge comprises one or more layers of a non-magnetic metal material. In some instances, the first metallic side bridge and the oxide layer comprises a thickness between 15 and 25 nm.

In some instances, the PMR write head can include an oxide layer (e.g., 608 in FIG. 6A and FIG. 6C) comprising a metallic oxide element and disposed between the first metallic side bridge and the HS portion. The oxide layer can include a thickness between 1 and 4 nanometers (nm) with a typical value ~2 nm.

The PMR write head can be illustrated as an equivalent bias circuit (e.g., 500) including at least a first bias electrical pad (e.g., 502) and a second electrical bias pad (e.g., 504) as shown in FIG. 5. The bias circuit can direct an electrical current flow along an electrical path between the tip portion of the main pole and the writer shield via the first metallic side bridge. R_tip (510) represents MP tip to writer shield equivalent contact resistance and R_lead (508) can include a sum of all the other resistance in the bias circuit, including lead resistance from one bias pad to MP, lead resistance through MP before MP tip to writer shield contact, lead resistance from one bias pad to writer shield and lead resistance through writer shield before writer shield in contact with MP tip. In some instances, the bias circuit can also include a protect resistor (e.g., 506) electrically connected between the first bias electrical pad and the second bias electrical pad. The lead resistor and the tip resistor can be disposed in parallel with the protect resistor. In some instances, the bias circuit is disposed in parallel to a dynamic fly height (DFH) writer heater.

In some embodiments, the PMR write head can include a second metallic side bridge (e.g., 622 in FIG. 6D) electrically connection between MP tip (602 in FIG. 6C and 612 in FIG. 6D) and side shield (e.g., 604 in FIG. 6C) and leading shield (e.g., 620 in FIG. 6D). The electrical current flow can be further directed along the between the tip portion of the main pole and the write shield via the second metallic side bridge.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A perpendicular magnetic recording (PMR) write head comprising:
- a main pole (MP) including a tip portion;
- a hot seed (HS) portion;
- a first write shield connected to the HS portion and disposed at an air bearing surface (ABS);
- a first metallic side bridge disposed between the tip portion of the main pole and the HS portion;
- an oxide layer disposed between the first metallic side bridge and the HS portion to electrically isolate the first metallic side bridge and the HS portion; and
- a bias circuit connecting the tip portion of the main pole and the write shield via the first metallic side bridge.

2. The PMR write head of claim 1,
- wherein the bias circuit includes at least a first bias electrical pad and a second bias electrical pad, the bias circuit directing an electrical current flow along an electrical path between the tip portion of the main pole and the write shield via the first metallic side bridge.

3. The PMR write head of claim 2, further comprising:
- a protect resistor electrically connected between the first bias electrical pad and the second bias electrical pad,
- a lead resistor including a first lead resistance from the first or the second bias electrical pad that is directly connected to the MP, and a second lead resistance from the first or the second bias electrical pad that is directly connected to the write shield; and
- a tip resistor connected in series between the first bias electrical pad and the second bias electrical pad, the lead resistor and the tip resistor disposed in parallel with the protect resistor.

4. The PMR write head of claim 2, wherein the bias circuit includes a series resistor (Rs) to control a bias current through the tip portion of the main pole and the write shield via the first metallic side bridge.

5. The PMR write head of claim 2, further comprising:
- a metallic side gap and a metallic leading gap, which forms a second metallic side bridge between the tip portion and the write shield, electrically connected at the tip portion.

6. The PMR write head of claim 5, wherein the electrical current flow is further directed along the tip portion of the main pole and the write shield via the second metallic side bridge.

7. The PMR write head of claim 1, wherein the oxide layer comprises a metallic oxide element, wherein a thickness of the oxide layer is between 1-4 nanometers, and wherein the first metallic side bridge comprises a thickness together with the thickness of the oxide layer between 15 and 25 nm.

8. The PMR write head of claim 1, wherein the first metallic side bridge comprises one or more layers of a non-magnetic metal material.

9. A write head comprising:
- a main pole (MP) including a tip portion configured to be disposed at an air-bearing surface (ABS) and configured to interact with a magnetic recording medium;
- a hot seed (HS) portion;
- a write shield connected to the HS portion and disposed at the ABS;
- a first metallic side bridge disposed between the tip portion of the main pole and the HS portion;
- an oxide layer comprising a metallic oxide element disposed between the first metallic side bridge and the HS portion to electrically isolate the first metallic side bridge and the HS portion; and
- a bias circuit connecting the tip portion of the main pole and the write shield via the first metallic side bridge.

10. The write head of claim 9, wherein the bias circuit directs an electrical current flow along an electrical path between the tip portion of the main pole and the write shield via the first metallic side bridge, the bias circuit including:
- a first bias electrical pad;
- a second bias electrical pad;
- a protect resistor electrically connected between the first bias electrical pad and the second bias electrical pad; and
- a lead resistor including a first lead resistance from the first bias electrical pad or the second bias electrical pad that is directly connected to the MP and a second lead resistance from the first or second bias electrical pad that is directly connected to the write shield, and a tip resistor connected in series between the first bias electrical pad and the second bias electrical pad, the lead resistor and the tip resistor disposed in parallel with the protect resistor.

11. The write head of claim 10, wherein the bias circuit includes a series resistor (Rs) to control a bias current through the tip portion of the main pole and the write shield via the first metallic side bridge.

12. The write head of claim 10, further comprising:

a metallic side gap and a metallic leading gap, which forms a second metallic side bridge between the MP tip portion and the write shield, electrically connected at a MP tip region.

13. The write head of claim 12, wherein the electrical current flow is further directed between the tip portion of the main pole and the write shield via the second metallic side bridge.

14. The write head of claim 9, wherein the first metallic side bridge comprises one or more layers of a non-magnetic metal material.

15. A system comprising:

a main pole (MP) including a tip portion configured to be disposed at an air-bearing surface (ABS) and configured to interact with a magnetic recording medium;

a hot seed (HS) portion;

a first write shield connected to the HS portion and disposed at the ABS;

a first metallic side bridge disposed between the tip portion of the main pole and the HS portion;

a metallic side gap and a metallic leading gap, which forms a second metallic side bridge between the MP tip portion and the write shield, electrically connected at a MP tip region;

an oxide layer disposed between the first metallic side bridge and the HS portion to electrically isolate the first metallic side bridge and the HS portion; and a bias circuit connecting the tip portion of the main pole and the first write shield via the first metallic side bridge.

16. The system of claim 15, wherein the bias circuit includes at least a first bias electrical pad and a second bias electrical pad, the bias circuit directing an electrical current flow along an electrical path between the tip portion of the main pole and the write shield via the first metallic side bridge, and between the tip portion of the main pole and the write shield via the second metallic side bridge.

17. The system of claim 16, further comprising:

a protect resistor electrically connected between the first bias electrical pad and the second bias electrical pad; and a lead resistor including a first lead resistance from the first or the second bias electrical pad that is directly connected to the MP and a second lead resistance from the first or second bias electrical pad that is directly connected to the write shield, and a tip resistor, the lead resistor and the tip resistor connected in series between the first bias electrical pad and the second bias electrical pad, the lead resistor and the tip resistor disposed in parallel with the protect resistor.

18. The system of claim 16, wherein the bias circuit includes a series resistor Rs to control a bias current through the tip portion of the main pole and the write shield via the first and the second metallic side bridge.

19. The system of claim 15, wherein the first metallic side bridge comprises one or more layers of a non-magnetic metal material.

* * * * *